(12) United States Patent
Nagayama et al.

(10) Patent No.: US 6,384,882 B1
(45) Date of Patent: May 7, 2002

(54) ACTIVE MATRIX LIQUID CRYSTAL DISPLAY DEVICE INCLUDING WIRING LINE WITH LIGHT BLOCKING PROPERTY COLUMNAR SPACERS AND FRAME PATTERN AROUND DISPLAY AREA

(75) Inventors: Kohei Nagayama; Yasuyuki Hanazawa; Tetsuya Iizuka, all of Fukaya (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 23 days.

(21) Appl. No.: 09/707,834

(22) Filed: Nov. 8, 2000

(30) Foreign Application Priority Data

Nov. 16, 1999 (JP) .......................................... 11-326044

(51) Int. Cl.[7] ..................... G02F 1/1333; G02F 1/1335; G02F 1/1339
(52) U.S. Cl. ....................... 349/110; 349/106; 349/153; 349/156
(58) Field of Search ........................... 349/44, 106, 110, 349/111, 153, 190, 155, 156; 345/87, 92

(56) References Cited

U.S. PATENT DOCUMENTS 5,946,070 A * 8/1999 Kohama et al. ............ 349/156
5,952,676 A * 9/1999 Sato et al. .................... 257/59
5,995,191 A * 11/1999 Tamai et al. ................ 349/110
6,238,754 B1 * 5/2001 Shohara et al. .......... 252/299.5
6,304,308 B1 * 10/2001 Saito et al. ................. 349/110

* cited by examiner

Primary Examiner—William L. Sikes
Assistant Examiner—Tarifur R. Chowdhury
(74) Attorney, Agent, or Firm—Oblon, Spivak, McClelland, Maier & Neustadt, P.C.

(57) ABSTRACT

A liquid crystal display device has an array substrate and an opposite substrate arranged opposite to each other through a plurality of columnar spacers with a liquid crystal layer sandwiched therebetween. A plurality of wiring lines and coloring layers are provided over the array electrode. A frame pattern is formed on the array substrate at the outer side of the display area to prevent a light leakage at the outer peripheral edge of the display area. The frame pattern is so provided as to have a gap relative to the outermost peripheral side columnar spacers. At a gap between the frame pattern and the outermost peripheral side columnar spacers, a wiring line is provided with its portion formed in an overlapping relation to the frame pattern, thus blocking light.

8 Claims, 3 Drawing Sheets

ACTIVE MATRIX LIQUID CRYSTAL DISPLAY DEVICE INCLUDING WIRING LINE WITH LIGHT BLOCKING PROPERTY COLUMNAR SPACERS AND FRAME PATTERN AROUND DISPLAY AREA

CROSS-REFERENCE TO RELATED APPLICATIONS

This application is based upon and claims the benefit of priority from the prior Japanese Patent Application No. 11-326044, filed Nov. 16, 1999, the entire contents of which are incorporated herein by reference.

BACKGROUND OF THE INVENTION

The present invention relates to a liquid crystal display device and, in particular, to an active matrix type liquid crystal display device having coloring layers on an array substrate side.

A liquid crystal display device includes two substrates having their alignment films arranged opposite to each other with a liquid crystal layer sandwiched between these two substrates. The two substrates are joined by a sealing material and hermetic sealing material to each other at their peripheral areas. Between the two substrates, granular spacers or columnar spacers are arranged to maintain the gap between the substrates to a predetermined value, the columnar spacer being formed from a resin by a photolithography method. In the case where a color display is made by the liquid crystal display device, red (R), green (G) and blue (B) coloring layers are generally arranged on one of these substrates.

Usually, a frame pattern having a light blocking property is formed on the outer side of the substrates display area to prevent a light leakage from backlight. As a frame pattern material use is made of a metal thin film, such as Cr, Mo, or W or a resin.

In the case where coloring layers are formed on the array substrate, in addition to the R, G, B coloring layers, a black coloring layer is used to form the columnar spacer and frame pattern simultaneously. At this time, the black coloring layer can be formed on the R, G, B coloring layers so as to provide a desired cell gap. In order to maintain the cell gap uniformly, the columnar spacers are provided also at the sealing section. In the case where, however, the frame pattern is so formed as to extend to the sealing section and made thicker, a distance between the columnar spacers and frame pattern is narrowed. This causes a process defect such as the contacting of the columnar spacers with the frame pattern and a resultant irregular gap formation. In order to prevent this, it is necessary to space the columnar spacers away from the frame pattern, so that the frame of the liquid crystal display device becomes wider.

In order to narrow the width of the frame of the liquid crystal device it is considered that the width of the frame pattern is made narrower. However, the extent to which the frame pattern and a bezel are overlapped becomes also narrower, thus resulting in a "light leakage" problem.

BRIEF SUMMARY OF THE INVENTION

The present invention has been contrived in consideration of the above-mentioned problems and its object is to provide an active matrix type liquid crystal display device which can narrow a frame without a light leakage occurring.

In order to achieve the above-mentioned object of the present invention there is provided a liquid crystal display device comprising an array substrate including a display area having a plurality of scanning lines formed on an insulating substrate, a plurality of signal lines arranged in an intersecting relation to the scanning lines, switching elements arranged near each intersection between the scanning line and the signal line, coloring layers covering the scanning lines, signal lines and switching elements, and a plurality of pixel electrodes formed on the coloring layers and connected to the switching elements, a wiring line arranged along the outer peripheral portion of the display area and having a light blocking property, a plurality of spacers provided on the coloring layers in the display area, and a frame pattern formed around the display area to prevent a light leakage at the peripheral edge of the display area; an opposite substrate arranged opposite to the array substrate and spaced a predetermined gap from the array substrate by the spacers; a sealing material provided around the frame pattern and joining the peripheral edge portions of the array substrate and opposite substrate; and a liquid crystal layer sealed in the gap between the array substrate and the opposite substrate, wherein the wiring line has its portion arranged in an overlapping relation to the frame pattern to provide a light blocking area for blocking light at the outer peripheral portion of the frame pattern.

According to the liquid crystal display device of the present invention, the spacers include columnar spacers arranged on the outer side of the frame pattern and spaced from the frame pattern with a gap left and the wiring line is provided in an overlapping relation to the gap between the frame pattern and the columnar spacers provided on the outer side of the frame pattern.

According to the liquid crystal display device thus constructed, the wiring line having a light blocking property is arranged at the outer peripheral portion of the frame pattern to block light at the gap at the outer side portion of the frame pattern, that is, at the gap between the outermost peripheral side columnar spacers and the frame pattern. Even if, therefore, the frame pattern has its width narrowed to be spaced from the outermost peripheral side columnar spacers, the effective light blocking width of the frame area is made thicker and it is possible to provide a liquid crystal display device which can narrow the frame without a light leakage occurring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An active matrix type liquid crystal device according to an embodiment of the present invention will be described in detail with reference to the accompanying drawings.

Figure 1:
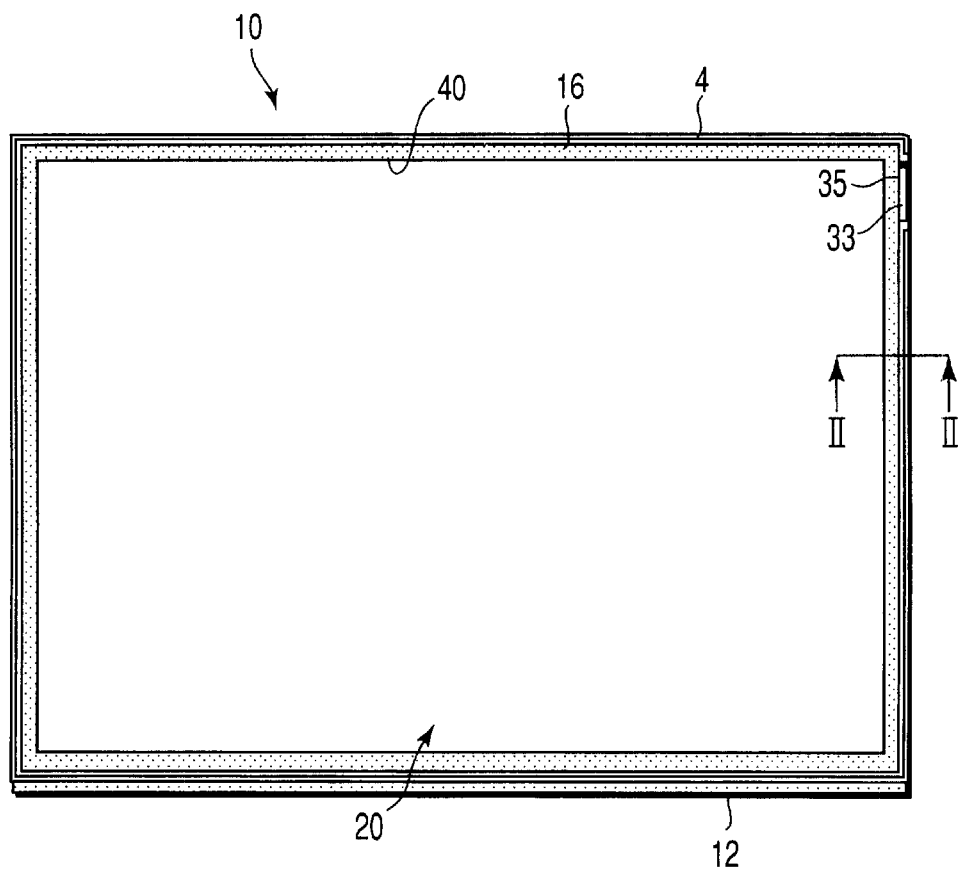
FIG. 1 is a plan view showing an active matrix type liquid crystal device according to an embodiment of the present invention.
Figure 2:
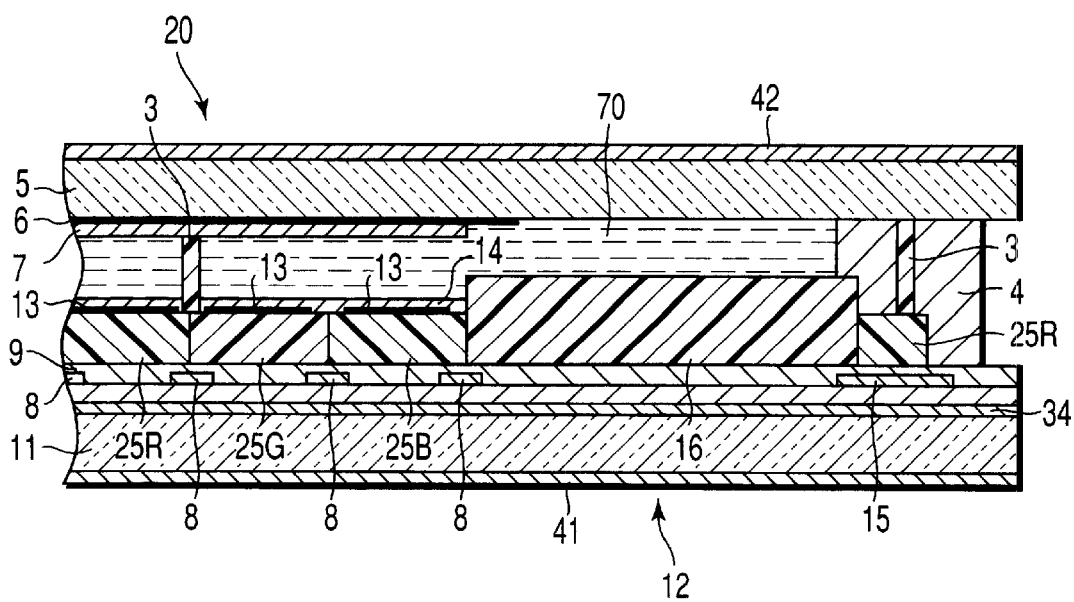
FIG. 2 is a cross-sectional view as taken along line II—II in FIG. 1.

As shown in FIGS. 1 and 2, a liquid crystal display device 10 includes an array substrate 12 with coloring layers provided as a color filter and an opposite substrate 20 arranged opposite to the array substrate with a predetermined cell gap therebetween. A liquid crystal layer 70 is held between the array substrate 12 and the opposite substrate 20.

The array substrate 12 and opposite substrate 20 have their peripheral edges to be joined by a sealing material 4 with which the outer peripheral edge of a display area 40 of the liquid crystal display device is surrounded. A liquid crystal filling hole 35 is formed in a portion of the sealing material 4 and, after the filling of the liquid crystal, is sealed with a hermetic sealing material 33.

The opposite substrate 20 is so formed that a transparent electrode 6 of ITO and an alignment film 7 are formed in that order on a transparent substrate 5 of glass.

Figure 3:
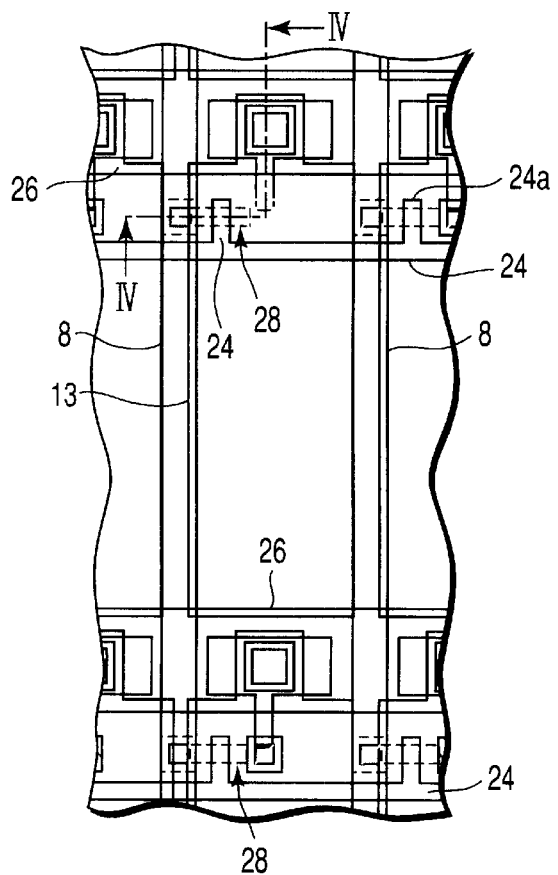
FIG. 3 is a plan view, partly enlarged, showing an array substrate of the liquid crystal display device.
Figure 4:
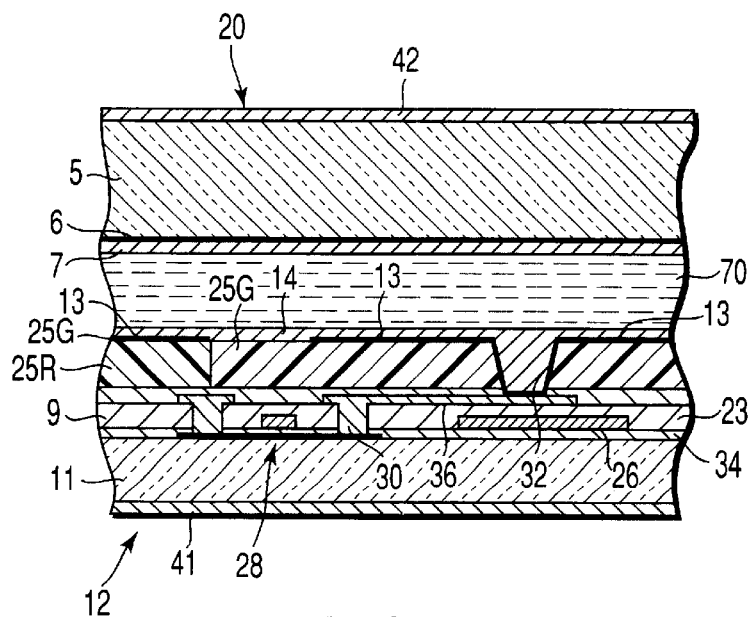
FIG. 4 is a cross-sectional view as taken along line IV—IV in FIG. 3.

As shown in FIGS. 2 to 4, the array substrate 12 having the color filter has a transparent substrate 11. A plurality of scanning lines 24 and storage capacitance lines 26 provided parallel to the scanning lines are arranged on the transparent substrate 11 and a plurality of signal lines 8 are provided on the transparent substrate 11 such that they are arranged orthogonal to these lines 24 and 26 through an insulating film 23. In the neighborhood of an intersection between the scanning line 24 and the signal line 8, a TFT element 28 of an Nch type LDD structure serving as a switching element, a source electrode 30 and a pixel electrode 13 are arranged such that the source electrode 30 is electrically connected to the TFT element 28 and the pixel electrode 13 is connected to the source electrode.

In the peripheral portion of the effective display area 40, a liquid crystal drive circuit (not shown) is formed simultaneously with the TFT elements 28 on the array substrate 12 and, in the neighborhood of the display area 40, a plurality of wiring lines 15 necessary to operate the liquid crystal drive circuit are provided.

A protective insulating film 9 is provided to cover the TFT elements 28 and the liquid crystal drive circuit and, over the protective insulating film 9, green coloring layers 25G, blue coloring layers 25B and red coloring layers 25R are arranged in a stripe-like pattern. Each of the pixel electrodes 13 is formed on the corresponding coloring layer and connected to the source electrode 30 through a contact hole 32 in the coloring layer and protective insulating film 9. Further, an alignment film 14 is so provided over a whole surface of the transparent substrate 11 as to cover the pixel electrodes 13 and the coloring layers.

A rectangular frame pattern 16 with which the outer peripheral edge of the display area 40 is surrounded is formed over the glass substrate 11 of the array substrate 12 and is comprised of a black coloring layer of a predetermined width. The frame pattern 16 is formed to be thicker than the remaining coloring layers 25G, 25B and 25R. A number of columnar spacers 3 are formed at a desired density on the pixel electrode 13 simultaneously with the frame pattern 16. The sealing material 4 is so formed at the outer peripheral portion of the display area 40 as to be situated on the outer side of the frame pattern 16.

The array substrate 12 and the opposite substrate 20 are joined by the sealing material 4 at their outer edge portions and the cell gap between these substrates are so maintained by the many columnar spacers 3 as to have a predetermined value. The columnar spacers 3 are also formed with predetermined intervals on the outer side of the frame pattern 16 and spaced a predetermined distance from the outer peripheral edge of the frame pattern 16.

The wiring lines 15 are formed of a light blocking metal and situated below the sealing member 4. A portion of the wiring line 15 is situated in an overlapping relation to the outer peripheral edge portion of the frame pattern 16. By doing so, the wiring line 15 blocks light at the gap area between the outermost peripheral side columnar spacers 3 and the frame pattern 16 and provides a light blocking area of the present invention.

An explanation will be made about a more detail structure of the above-mentioned active matrix type liquid crystal display device and its manufacturing method.

First, an about 50 nm thick a-Si film is deposited by a CVD method, etc., on a light-transmissive insulating substrate 11 such as a high strain point substrate and quartz substrate. After a resultant structure has been annealed at 450° C. for one hour in a furnace, it is irradiated with an XeCl excimer laser to convert the a-Si film to a poly-Si film. Thereafter, the poly-Si film is patterned by a photoetching method to provide a channel layer of a TFT element 28 (hereinafter referred to as a pixel TFT) at each pixel section in the display area 40 and channel layers of TFTs (hereinafter referred to as circuit TFTs) at a liquid crystal drive circuit area not shown and, further, underlying electrodes of a storage capacitance elements are formed.

Then an about 100 nm thick silicon oxide film, not shown, serving as a gate insulating film 34 is deposited by a CVD method on the whole surface of the insulating substrate 11. Then an about 400 nm thick single element of Ta, Cr, Al, Mo, W, Cu, etc., or its stacked layer or alloy film is deposited on the whole surface of the silicon oxide film and a resultant surface is pattern by a photoetching method to a predetermined configuration to form scanning lines 24, gate electrodes 24a of pixel TFTs as extensions of the scanning lines, storage capacitance lines 26, gate electrodes of circuit TFTs and various kinds of wiring lines in a drive circuit area. At this time, a wiring line necessary to drive the liquid crystal drive circuit is also formed.

Then an impurity is implanted in the above-mentioned channel layers, by virtue of an ion implanting method or ion doping method, with the gate electrodes 24a used as a mask to provide source and drain electrodes not shown of the TFT elements 28 and source and drain electrodes not shown of Nch type circuit TFTs. An impurity implantation is carried out by high concentration implanting phosphorus, for example, at an acceleration voltage 80 KeV and a dose of $5 \times 10^{15}$ atoms/com$^2$ with the use of $PH_3/H_2$.

Then a resist is coated so as not to implant any impurity in the pixel TFTs, not shown, and Nch type circuit TFTs of a drive circuit region and, with the gate electrodes of Pch type circuit TFTs, not shown, used as a mask, boron is high concentration implanted at an acceleration voltage of 80 KeV and a dose of $5 \times 10^{15}$ atoms/cm$^2$ with the used of $B_2PH_6/H_2$ to provide source and drain electrodes of the Pch type circuit TFTs.

Thereafter, in order to form an Nch LDD (lightly Doped Drain) not shown, an impurity implantation is carried out and the impurity is activated by annealing. Further, an about 500 nm thick insulating interlayer 23 of a silicon oxide is formed, by a PECVD method for instance, on the whole surface of the insulating substrate 11.

Then a contact hole leading to the source electrode of each of the TFT elements 28, a contact hole leading to the drain electrode thereof and contact holes leading to the source and drain electrodes of each circuit TFT, not shown, are formed in the insulating interlayer 23.

An about 500 nm thick single element of Ta, Cr, Al, Mo, W, Cu, etc., or its stacked film or alloy film is deposited on the insulating interlayer 23 and is patterned by a photoengraving method to a predetermined configuration. By doing so, a signal line 8 connected to the drain electrode of each TFT element 28, an overlying electrode 36 of a storage capacitance connected to each source electrode 30 and various kinds of wiring lines of the circuit TFTs in the liquid crystal drive circuit area not shown are formed.

At this time, in order to prevent a light leakage at a bezel edge, the wiring line 15 necessary to operate the liquid crystal drive circuit is provided at an outer peripheral side of a frame pattern 16 to be formed at a later step, as shown in FIG. 2.

Then a protective insulating film 9 of SiNx is formed by the PECVD method on the whole surface of the insulating substrate 11 and a contact hole leading to each overlying electrode 36 is formed by a photo-engraving method.

Then a UV curing type acrylic green color resist solution is spin-coated by a spinner on the insulating substrate 11 to a thickness of about 2 μm. Thereafter, it is pre-baked for about five minutes at about 90° C. and exposed with an ultraviolet light of an intensity of 150 mJ/cm² with the use of a predetermined mask pattern. The photomask pattern used here has stripe-shaped patterns corresponding to green coloring layers 25G and 15 μm-diameter circular patterns as contact holes 32 for connecting the pixel electrodes 13 and overlying electrodes 36.

Then a resultant structure is developed for about 60 seconds with the use of an about 0.1 weight percent of TMAH (tetramethylammoniumhydride) aqueous solution and, after being washed with water, post-baked for one hour at about 20° C. to provide green coloring layers 25G having contact holes 32.

Then blue coloring layers 25B and red coloring layers 25R are formed in a similar step. At this time, a pattern edge of each green coloring layer 25G is so constructed as to be covered with the blue coloring layer 25B and red coloring layer 25R. This is achieved by effecting a manufacture to be matched to an exposure mask used in the work process of the respective coloring layers.

Then an indium-tin oxide (ITO) is deposited by a sputtering method on the coloring layers 25R, 25G and 25B and patterned to provide corresponding pixel electrodes 13 on these coloring layers.

Then a frame pattern 16 and a plurality of columnar spacers 3 are formed by an about 3 to 6 μm-thick black coloring layer in which case the frame pattern is formed around the outer peripheral edge portion of the display area 40. The frame pattern 16 is formed to be overlapped at an outer peripheral edge portion with a portion of the wiring line 15. Further, some of the columnar spacers 3 are provided at predetermined intervals at a place to be coated with a later-described sealing material 4, that is, on the outer side of the frame pattern 16. At this time, the coloring layer 25R or either one of the coloring layers 25G, 25R is formed below the columnar spacer 3 on the outer side of the frame pattern 16 to adjust the height of the columnar spacer 3.

Then an alignment agent of polyimide is coated on the whole substrate 11 and is applied with an alignment treatment to form an alignment film 14, thus obtaining an array substrate 12 having a color filter.

On the other hand, an about 100 nm thick ITO is deposited by a sputtering method on a transparent insulating substrate 5 to provide an opposite electrode 6 and an alignment film agent of polyimide is coated on the whole surface of the substrate and an alignment film 7 is formed by an alignment process, thereby obtaining an opposite substrate 20.

A sealing material 4 is coated on the outer peripheral edge portion of the thus formed opposite substrate 20 except a filling hole 35. The opposite substrate 20 and the array substrate 12 equipped with the color filter are joined by the sealing material 4 to each other on the outer peripheral edge side of the frame pattern 16 to complete a cell in an empty state.

Then a nematic liquid crystal material with a chiral material added is vacuum filled into the cell through the filling hole 35 and, after being filled, the filling hole 35 is sealed with a UV curing resin serving as a hermetic sealing material 33. By attaching polarizing plates 41 and 42 to both the outer surfaces of the cell, a liquid crystal display device 10 is completed.

According to the thus formed liquid crystal display device, the width of the frame pattern 16 is narrowed so as to define a gap between the frame pattern and the outermost side columnar spacers 3, thereby preventing a process defect such as the contacting of the frame pattern with the columnar spacers and eliminating an irregular gap. At the same time, the frame width of the device can be narrowed by an about 1 mm in comparison with that of a conventional structure. By blocking light by the wiring line 15 at a gap area between the frame pattern 16 and the outermost peripheral side columnar spacers 3, no light leakage occurs.

Figure 5:
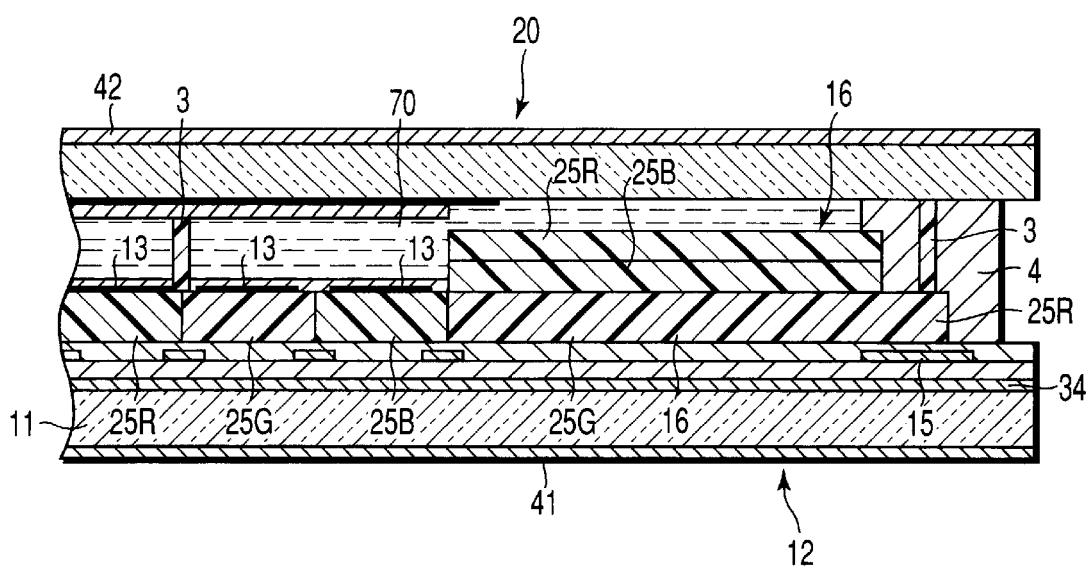
FIG. 5 is a cross-sectional view showing a liquid crystal display device according to another embodiment of the present invention.

The present invention is not restricted to the above-mentioned embodiment and various changes or modifications of the present invention can be made without departing from the spirit and scope of the present invention. Although, in the above-mentioned embodiment, the frame pattern 16 has been explained as being formed simultaneous with the columnar spacers 3 in a display area and with the use of the same material as the columnar spacers 3, a frame pattern 16 may be formed with two or three coloring layers stacked as shown in FIG. 5. In this case, the same function and advantages can be obtained even using transparent insulating layers in place of the coloring layers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   an array substrate including a display area having a plurality of scanning lines formed on an insulating substrate, a plurality of signal lines provided in an intersecting relation to the scanning lines, a switching element provided near each intersection between the scanning line and the signal line, coloring layers covering the scanning lines, signal lines and switching elements and a plurality of pixel electrodes formed on the coloring layers and connected to the switching elements, a wiring line provided along an outer peripheral portion of the display area and having a light blocking property, a plurality of columnar spacers provided on the coloring layers in the display area, and a frame pattern provided around the display area to prevent a light leakage at the peripheral edge of the display area;

an opposite substrate arranged opposite to the array substrate with a predetermined gap being defined between the array substrate and the opposite substrate by the columnar spacers;

sealing material provided around the frame pattern, joining the peripheral edge portions of the array substrate and the opposite substrate; and a liquid crystal layer filled into the gap between the array substrate and the opposite substrate, wherein the wiring line has its portion provided in an overlapping relation to the frame pattern and provides a light blocking area for blocking light at the outer side of the frame pattern.

2. A liquid crystal display device according to claim 1, wherein the columnar spacers include columnar spacers arranged on the outer side of the frame pattern and spaced from the frame pattern with a gap left; and the wiring line is provided in an overlapping relation to the gap between the frame pattern and the columnar spacers arranged on the outer side of the frame pattern.

3. A liquid crystal display device according to claim 2, wherein the columnar spacers and frame pattern are formed of the same black coloring layer.

4. A liquid crystal display device according to claim 2, wherein the frame pattern is formed of at least two stacked coloring layers.

5. A liquid crystal display device according to claim 2, wherein the frame pattern is formed of at least two stacked transparent insulating layers.

6. A liquid crystal display device according to claim 1, wherein the columnar spacers and frame pattern are formed of the same black coloring layer.

7. A liquid crystal display device according to claim 1, wherein the frame pattern is formed of at least two stacked coloring layers.

8. A liquid crystal display device according to claim 1, wherein the frame pattern is formed of at least two stacked transparent insulating layers.

\* \* \* \* \*